US007561886B1

United States Patent
Gonring et al.

(10) Patent No.: US 7,561,886 B1
(45) Date of Patent: Jul. 14, 2009

(54) METHOD FOR DETERMINING THE POSITION OF A MARINE VESSEL RELATIVE TO A FIXED LOCATION

(75) Inventors: Steven J. Gonring, Slinger, WI (US); Richard E. Staerzl, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 564 days.

(21) Appl. No.: 11/327,139

(22) Filed: Jan. 6, 2006

(51) Int. Cl.
*G01C 21/00* (2006.01)
(52) U.S. Cl. .................................. 455/456.1; 340/514
(58) Field of Classification Search ............. 455/404.2, 455/456.1–456.6; 340/514–516, 541; 342/418, 342/428; 701/21, 207
See application file for complete search history.

(56) References Cited

U.S. PATENT DOCUMENTS

| | | | |
|---|---|---|---|
| 3,690,767 A | 9/1972 | Missio et al. | 356/5 |
| 3,707,717 A | 12/1972 | Frielinghaus | 343/6 R |
| 5,274,378 A | 12/1993 | O'Conner | 342/23 |
| 5,933,110 A | 8/1999 | Tang et al. | 342/357.11 |
| 6,268,829 B1 | 7/2001 | Weckstrom | 342/418 |
| 6,492,933 B1 | 12/2002 | McEwan | 342/28 |
| 2007/0106462 A1* | 5/2007 | Blain et al. | 701/207 |

OTHER PUBLICATIONS

U.S. Appl. No. 11/248,482, filed Oct. 12, 2005, Bradley et al.
U.S. Appl. No. 11/248,483, filed Oct. 12, 2005, Bradley et al.
"Direction Finding System" by Harry Lythall—SMOVPO; retrieved on Nov. 7, 2005 from http://web.telia.com/-u85920178/rx/df-00.htm, pp. 1-10.
Banner Engineering Corp., U-GAGE T30 Series with Analog And Discrete Outputs P/N 57438 Rev. C, pp. 1-12, Jan. 2003.

* cited by examiner

*Primary Examiner*—Sam Bhattacharya
(74) *Attorney, Agent, or Firm*—William D. Lanyi

(57) ABSTRACT

A method is provided by which a position of a marine vessel can be determined relative to a stationary object, such as a dock. Two position sensors are attached to a marine vessel and a microprocessor, onboard the marine vessel, computes various distances and angular relationships between the position sensors on the marine vessel and stationary transponders attached to the fixed device, such as a dock. The various dimensions and angular relationships allow a complete determination regarding the location and attitude of a marine vessel relative to the dock. This information can then be used by a maneuvering program to cause the marine vessel to be berthed at a position proximate the dock.

23 Claims, 6 Drawing Sheets

METHOD FOR DETERMINING THE POSITION OF A MARINE VESSEL RELATIVE TO A FIXED LOCATION

BACKGROUND OF THE INVENTION

1. Field of the Invention

The present invention relates generally to a method for determining a position of a marine vessel and, more particularly, to a method by which devices on a marine vessel can obtain information, in cooperation with fixed devices on shore, to allow a determination of the relative position and attitude of the marine vessel relative to a fixed location, such as a dock.

2. Description of the Related Art

Many different types of navigation and docking systems are known to those skilled in the art.

U.S. Pat. No. 3,690,767, which issued to Missio et al. on Sep. 12, 1972, describes an optical tanker docking system. The docking system is intended for large ocean going vessels. It comprises a laser pulse range radar system having a laser transmitter and receiver, a retroreflector, and receiving and transmitting optics. Two such systems are disposed on a dock. The retroreflectors are disposed at the bow and stern of a vessel. The laser systems share a time interval meter, a computer, and a display panel. The lasers track the retroreflectors as the ship approaches the dock and the time interval between the transmitted and received pulses is measured. Computations are made in the velocity of the approaching vessel, its distance from the dock, and the vessel position with reference to the dock are continually displayed. The information is then transmitted to the ship's captain.

U.S. Pat. No. 3,707,717, which issued to Frielinghaus on Dec. 26, 1972, describes a boat berthing monitor incorporating sonar and Doppler radar techniques. The system generates correction command signals relative to the berthing velocity profile of a vehicle in approach of a docking station. A Doppler radar system includes a radar transceiver. It projects signals between the docking position and the vehicle and respondingly generates Doppler shift frequency signals indicative of the velocity of the vehicle and the relative displacement thereof. A radar counter has preset initial counts stored therein which are indicative of anticipated initial berthing conditions and responds to the frequency shift signals by counting down from the initial counts in accordance with the Doppler shift.

U.S. Pat. No. 5,274,378, which issued to O'Conner on Dec. 28, 1993, describes a docking velocity indicator system. A relative velocity indicator system for assistance in the docking of vessels uses a radar sensor providing a relative velocity signal indicative of the relative velocity between a ship and a reference, such as a dock. A wireless transmitter associated with the radar sensor receives the relative velocity signal and transmits a signal indicative of the relative velocity signal. A portable receiver and indicator unit carried by the captain of the vessel has a receiver for receiving the transmitted signal and an indicator arranged to receive, from the receiver, a receiver signal indicative of the transmitted signal and, thereby, of the relative velocity signal for indicating the relative velocity between the ship and the reference.

U.S. Pat. No. 5,933,110, which issued to Tang et al. on Aug. 3, 1999, describes a vessel attitude determination system and method. A portable attitude determination apparatus and method are disclosed that can be used with a ship docking system. At least two receivers on a vessel receive global positioning system (GPS) satellite data. GPS carrier phase measurements are used to determine attitude of a moving platform. The phase measurements are processed to determine a precise vector from one receiver phase center to the other. The azimuth and elevation of a baseline vector is then computed.

U.S. Pat. No. 6,268,829, which issued to Weckstrom on Jul. 31, 2001, describes a Doppler direction finder and method of location using Doppler direction finder. It comprises at least one antenna spaced from a location point. The antenna is arranged in use to be rotated about the rotation point. The antenna is arranged to provide a first output signal comprising a signal received by the antenna combined with the Doppler shift component. There are means for providing a second output signal comprising the received signal without the Doppler shift component. Processing means process the first and second signals to obtain the Doppler shift component. Determining means determine from the Doppler shift component the direction from which the received signal is received.

U.S. Pat. No. 6,492,933, which issued to McEwan on Dec. 10, 2002, describes an SSB pulse Doppler sensor and active reflector system. A dual channel microwave sensor employs single sideband Doppler techniques in innumerable vibration, motion, and displacement applications. When combined with an active reflector, the sensor provides accurate range and material thickness measurements even in cluttered environments.

U.S. patent application Ser. No. 11/248,482, which was filed on Oct. 12, 1995 by Bradley et al., discloses a marine vessel maneuvering system. The vessel is maneuvered by independently rotating first and second marine propulsion devices about their respective steering axes in response to commands received from a manually operable control device, such as a joystick. The marine propulsion devices are aligned with their thrust vectors intersecting at a point on a centerline of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. patent application Ser. No. 11/248,483, which was filed on Oct. 12, 2005 by Bradley et al., discloses a vessel positioning system that maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change of the joystick from an active mode to an inactive mode. In this way, the operator can selectively maneuver the marine vessel manually and, when the joystick is released, the vessel will maintain the position in which it was at the instant the operator stopped maneuvering it with the joystick.

The patents described above are hereby expressly incorporated by reference in the description of the present invention.

A paper, titled "Direction Finding System" by Harry Lythall describes a roof mounted direction finding system which uses eight antennae for direction finding purposes. Appropriate circuitry is also described in the paper.

A product description pamphlet by the Banner Company describes a particular type of ultrasonic sensor which is available in commercial quantities and identified as the U-GAGE T30 series with analog and discreet outputs. Signals provided by these ultrasonic sensors allow a determination to be made regarding the distance between the sensor and an object that reflects signals transmitted by the sensors.

SUMMARY OF THE INVENTION

A method for determining the position of a marine vessel relative to a fixed structure, in a preferred embodiment, comprises the steps of providing first and second position sensors which are attached to the marine vessel and providing first and second fixed reference devices which are attached to the fixed structure and are stationary. The method further comprises the steps of determining first and second relative positions between the first sensor and the first and second fixed reference devices and between the second sensor and the first and second fixed reference devices. The method further comprises the step of determining a position of the marine vessel relative to the first and second fixed reference devices as a function of the first and second relative positions.

The first and second position sensors can be radio frequency (RF) transceivers. The method of a preferred embodiment of the present invention can further comprise the steps of transmitting an initiation signal from the first position sensor to the first fixed reference device, transmitting a response signal from the first fixed reference device back to the first position sensor in response to receiving the initiation signal, receiving the response signal by the first position sensor, and computing a distance between the first position sensor and the first fixed reference device as a function of the elapsed time between the initiation transmitting step and the response signal receiving step. The step of computing the distance between the first position sensor and the first fixed reference device as a function of the elapsed time between the initiation transmitting step and the response signal receiving step is performed by a microprocessor disposed on the marine vessel and connected in signal communication with the first position sensor.

In certain embodiments of the present invention, the first and second position sensors can be Doppler direction finders. The method can further comprise the steps of transmitting an initiation signal from the first position sensor to the first fixed reference device, transmitting a direction signal from the first fixed reference device to the first position sensor in response to receiving the initiation signal, receiving the direction signal by the first position sensor, and computing an angle between the first position sensor and the first fixed reference device as a function of frequency differences of the direction signal at a plurality of reception positions created by the first position sensor. The step of computing an angle between the first position sensor and the first fixed reference device as a function of frequency differences of the direction signal at a plurality of reception positions created by the first position sensor is performed by a microprocessor disposed on the marine vessel and connected in signal communication with the first position sensor in a preferred embodiment of the present invention. The method can further comprise the step of determining a first angular relationship between lines which extend from the first position sensor to the first and second fixed reference devices and determining a second angular relationship between lines which extend from the second position sensor to the first and second fixed reference devices. The first and second fixed reference devices can be radio frequency transponders.

The method of a preferred embodiment of the present invention can further comprise the step of determining an angular relationship between a first line which extends between the first and second position sensors and a second line which extends between the first and second fixed reference devices. It can further comprise the steps of determining a first distance between the first position sensor and the first fixed reference device and determining a second distance between the second position sensor and the second fixed reference device. The preferred embodiment of the present invention can further comprise the step of calculating an effective distance between the marine vessel and a stationary point as a function of the first and second distances. The first and second fixed reference devices can be attached to a dock.

In a particularly preferred embodiment of the present invention, the method can further comprise the step of maneuvering the marine vessel as a function of the position of the marine vessel relative to the first and second fixed reference devices.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
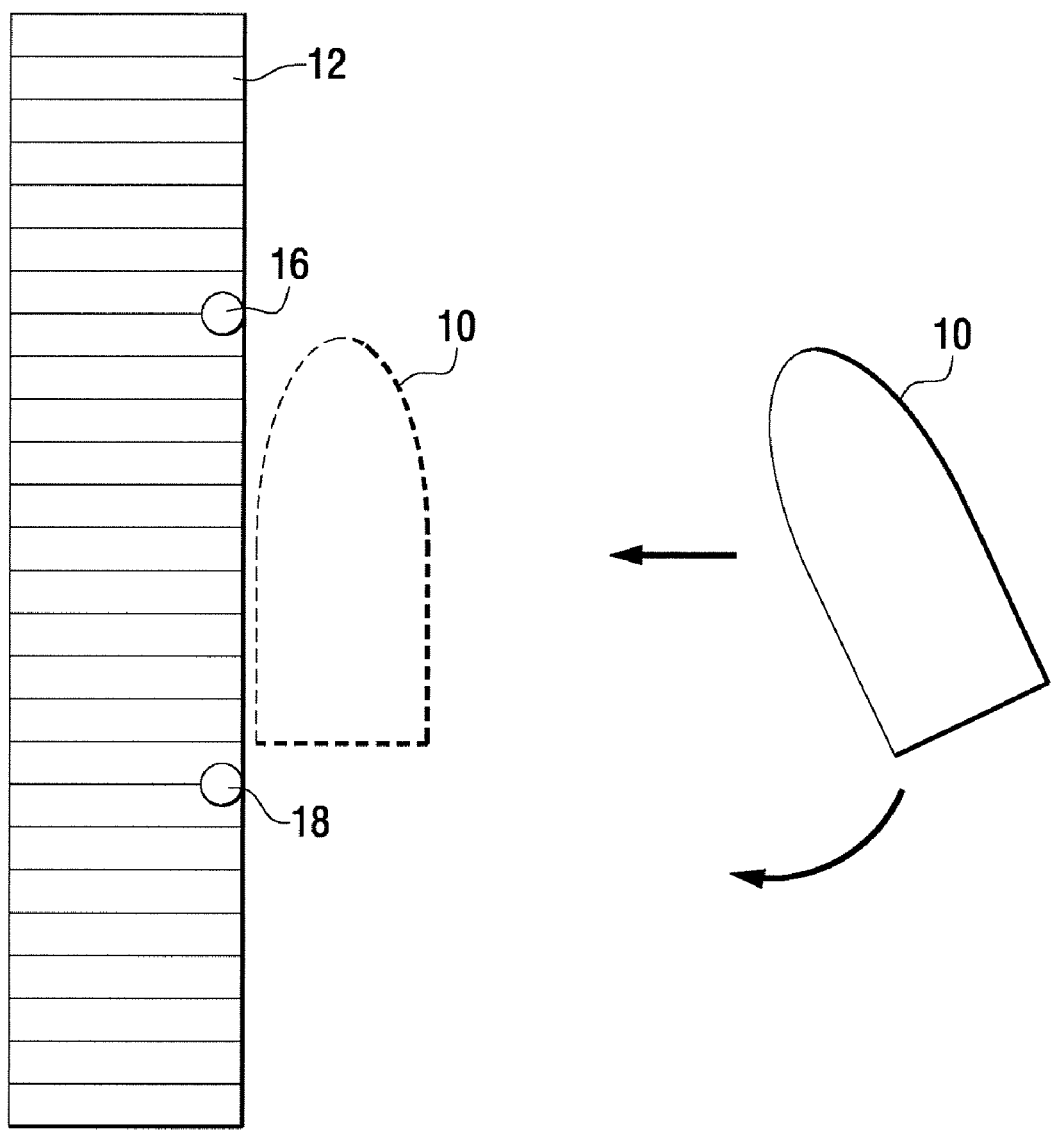
FIG. 1 is a simplified schematic representation of a circumstance in which a marine vessel must move from an initial position to a docking position.

Throughout the description of the preferred embodiment of the present invention, like components will be identified by like reference numerals.

FIG. 1 is a schematic representation showing a marine vessel 10 at a position relative to a fixed structure, such as a dock 12. The position of the marine vessel 10, represented by solid lines, is intentionally shown displaced from a desired mooring position of the marine vessel 10 which is represented by dashed lines in FIG. 1. The present invention is intended to provide a system by which information can be determined and then provided to appropriate equipment on the marine vessel 10 which allows the vessel to be properly maneuvered from the position of the vessel shown by solid lines in FIG. 1 to the berthed position represented by dashed lines in FIG. 1. Two fixed reference devices are also shown in FIG. 1. These are identified by reference numerals 16 and 18 and will be described in greater detail below.

Figure 2:
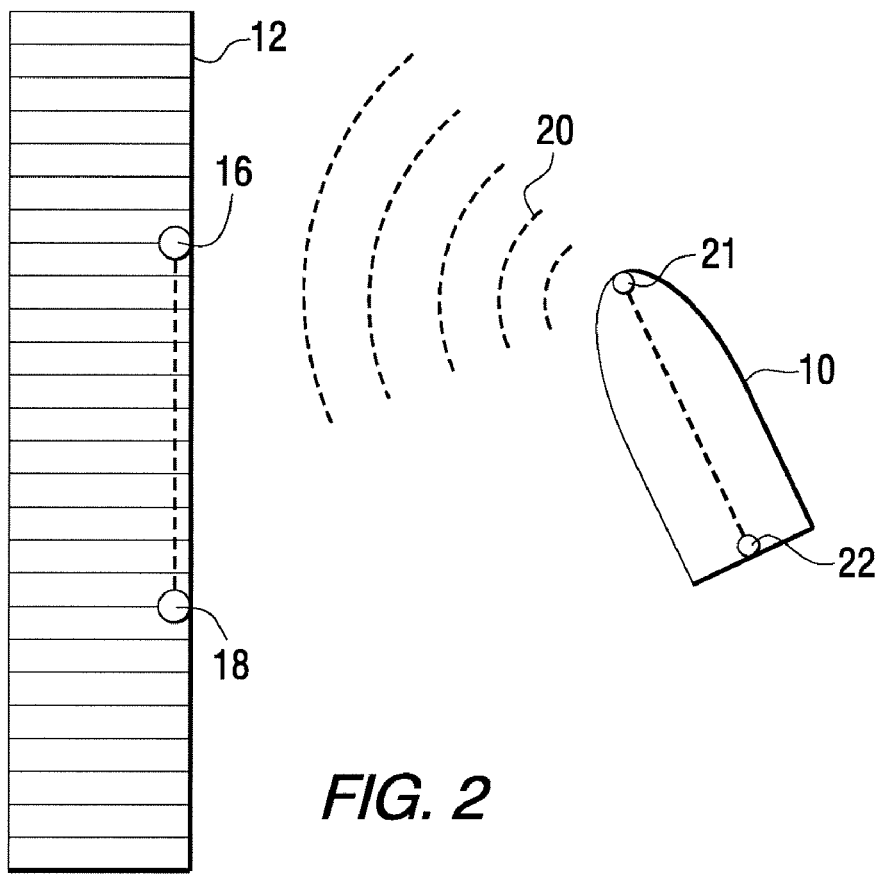
FIG. 2 illustrates a marine vessel in conjunction with one step of a method of a preferred embodiment of the present invention.

In a particularly preferred embodiment of the present invention, shown in FIG. 2, the method of the present invention begins with the transmission of an initiation signal 20 from a first position sensor attached to the marine vessel 10. FIG. 2 also shows a second position sensor 22 attached to the marine vessel 10. The operation of the second position sensor 22 will be described in greater detail below.

With continued reference to FIG. 2, the initiation signal 20 is transmitted from the first position sensor 21 toward the first fixed reference device 16. It is transmitted in a first frequency to which the first fixed reference device 16 is configured to be responsive. In alternate embodiments of the present invention, the first position sensor 21 can be a radio frequency (RF) transceiver or a Doppler direction finder. Both embodiments will be described below.

If the first position sensor 21 is a radio frequency transceiver, the initiation signal 20 is responded to, by the first fixed reference device 16, with a response signal. The response signal is received by the first position sensor 21. As will be described in greater detail below, the elapsed time between the transmission of the initiation signal 20 and the receipt of the response signal allows the calculation of the linear distance between the first position sensor 21 and the first fixed reference device 16.

With continued reference to FIG. 2, it should be understood that the procedure described above, in conjunction with the initiation signal 20 and the response signal transmitted by the first fixed reference device 16, can be repeated in conjunction with the first position sensor 21 and the second fixed reference device 18. This allows the linear distance between the second fixed reference device 18 and the first position sensor 21 to be calculated as a function of the time it takes for the initiation signal to travel to the second fixed reference device 18 and be responded to with a transmission from the second fixed reference device 18. In both instances, a known latency period which occurs between the receipt of the initiation signals by the fixed reference devices, 16 and 18, and the retransmission of a response signal by those devices is considered in the calculation of the distance between the first position sensor 21 and the two fixed reference devices, 16 and 18. For purposes of simplicity, FIG. 2 does not show representations of the other initiation signals. It should also be understood that a similar process is performed with regard to the second position sensor 22 and the two fixed reference devices, 16 and 18. The purposes of these calculations will be described in greater detail below.

Figure 3:
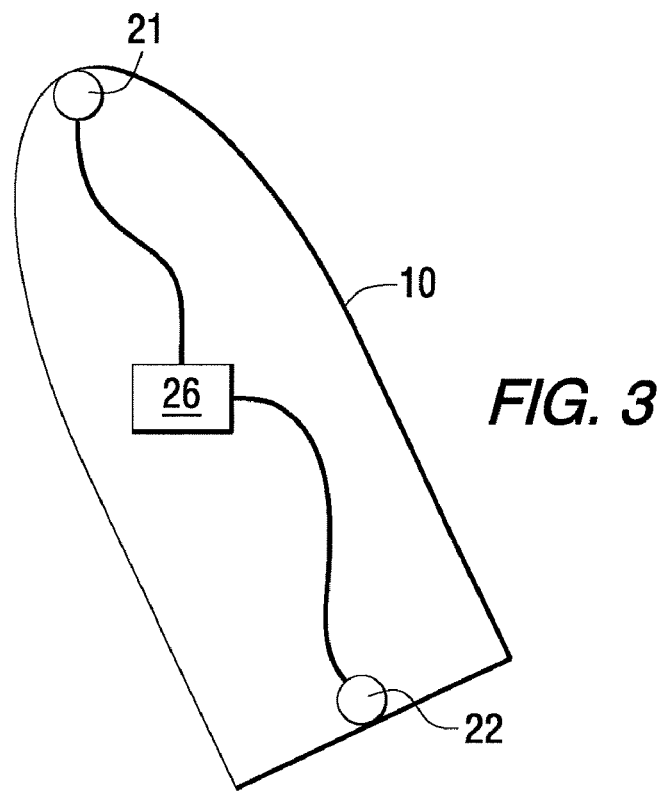
FIG. 3 is a schematic representation of a marine vessel with two position sensors and a microprocessor.

FIG. 3 is a schematic representation of the marine vessel 10 with the first and second position sensors, 21 and 22, mounted to the marine vessel at known locations. A microprocessor 26 is connected in signal communication with the first and second position sensors.

Figure 4:
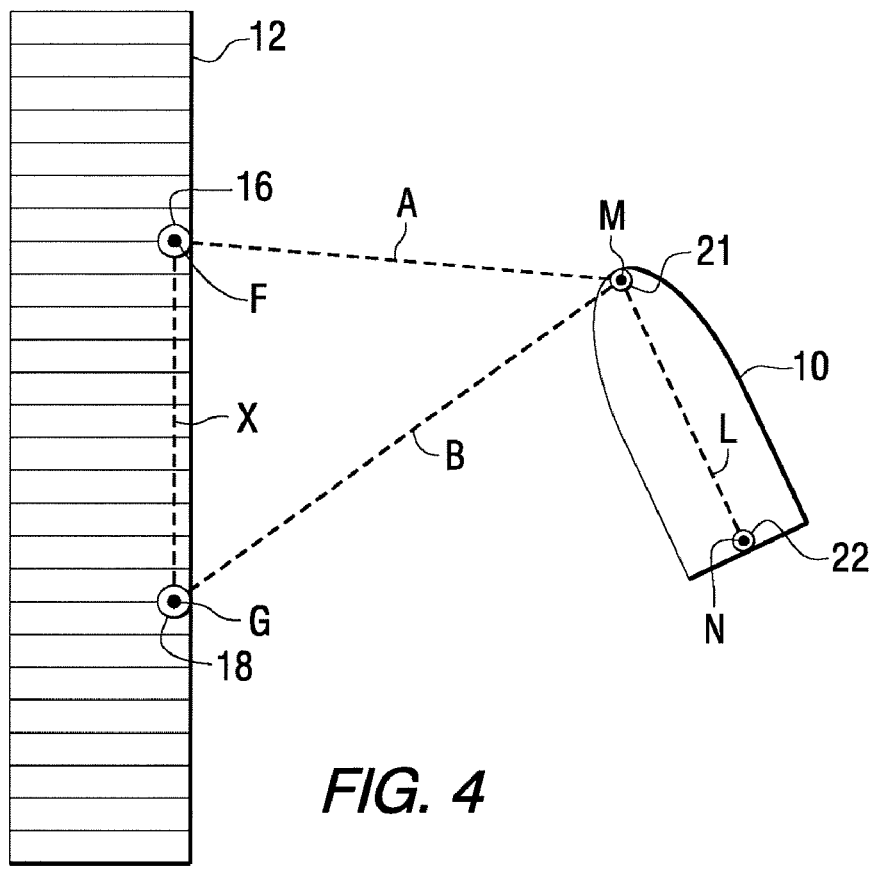
FIG. 4 shows one dimensional relationship between a marine vessel and a stationary object that can be determined by the method of a preferred embodiment of the present invention.

FIG. 4 shows the marine vessel 10, the dock 12, and several dashed lines that represent distances between various points. For example, dimension X is the distance between the first and second fixed reference devices, 16 and 18. For purposes of clarity, the points at which these fixed reference devices are located are identified as F and G in FIG. 4. Similarly, the positions at which the first and second position sensors, 21 and 22, are attached to the marine vessel 10 are identified as points M and N. In the description of FIG. 2, the methodology for determining the distances between the two position sensors, 21 and 22, and the two fixed reference devices, 16 and 18, was described. Dimension A in FIG. 4 represents the distance between the first position sensor 21 at point M and the first fixed reference device 16 at point F. Similarly, line B represents the distance between the first position sensor 21 at point M and the second fixed reference device 18 at point G.

With continued reference to FIG. 4, dashed line L represents the linear distance between the first and second position sensors, 21 and 22, which are identified as points M and N. The distances represented by lines A and B can be determined as described above by transmitting a signal from the first position sensor 21, receiving that signal by the first fixed reference device 16, responding by transmitting a signal from the first fixed reference device 16 back to the first position sensor 21, and receiving that response signal by the first position sensor 21. The microprocessor 26, described above in conjunction with FIG. 3, can then determine the total elapsed time for the signal to travel in both directions, including an empirically derived latency time. It can then calculate the distance A by subtracting the latency time from the total elapsed time, dividing by two, and mathematically calculating the distance A because the signal is known to travel at the speed of light. Distance B can be determined in the same way, but a preferred embodiment of the present invention would use a signal of a different frequency so that the microprocessor 26, in conjunction with the first position sensor 21, can discriminate between the signals received from the first and second fixed reference devices, 16 and 18.

Figure 5:
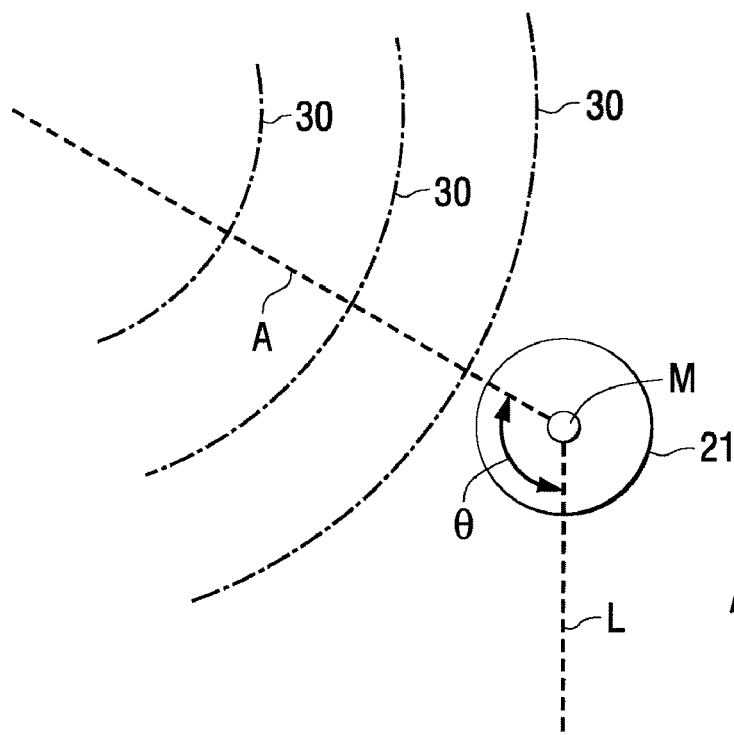
FIG. 5 is a schematic representation of one step of an embodiment of the present invention.

The methodology described immediately above to determine the lengths of lines A and B would typically use a radio frequency transceiver as both the first and second position sensors, 21 and 22. In alternative embodiments of the present invention, the first and second positions sensors, 21 and 22, could be alternatively Doppler direction finders. FIG. 5 illustrates how a Doppler direction finder can be used to provide the necessary information to determine the position of the marine vessel 10.

In FIG. 5, a response signal 30, comprising pulses of a known frequency, are transmitted by the fixed reference devices, 16 and 18. In a manner that is generally known to those skilled in the art, a Doppler direction finder used as the first position sensor 21 can determine the direction of the shortest distance between the Doppler direction finder and the source of the signal 30. The descriptive article identified above, published by Harry Lythall on the Internet, discloses this technique and exemplary circuitry used to process the signals. In addition, Doppler direction finders can be obtained from many other sources. In effect, a Doppler direction finder provides information relating to the magnitude of angle θ at point M between lines A and L. With reference to FIGS. 4 and 5, the Doppler direction finder can also easily provide information relating to the angle at point M between lines B and L. For convenience, the response signal 30 from the two fixed reference devices, 16 and 18, are different frequencies so that the Doppler direction finder used as the first position sensor 21 can discriminate between signals received from those two fixed reference devices.

Figure 6:
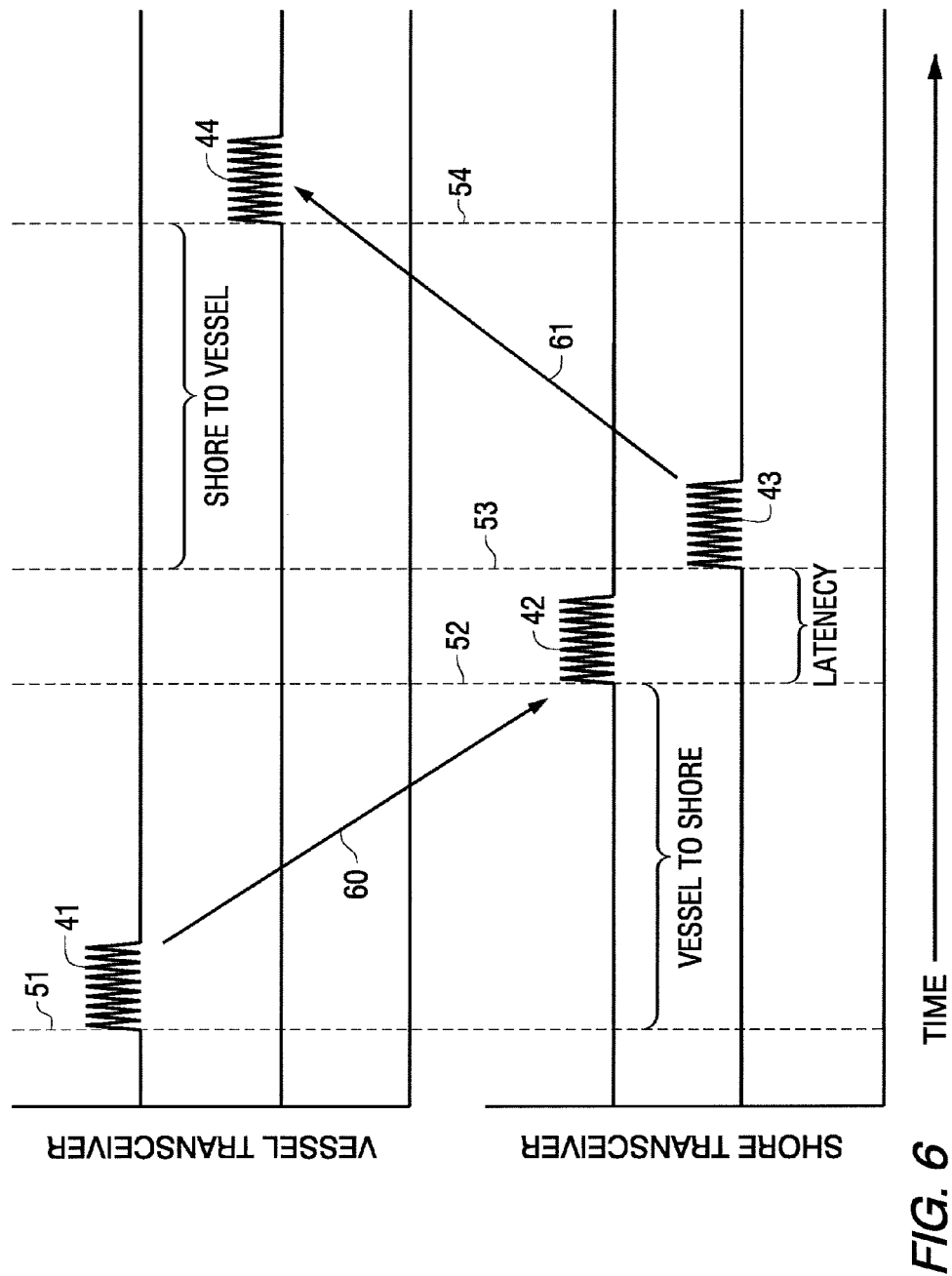
FIG. 6 is a graphical representation of a signal exchange which is part of one step of a method of a preferred embodiment of the present invention.

FIG. 6 is a graphical representation showing the specific methodology used by the present invention to determine the distance, represented by line A in FIG. 4, between a first position sensor 21 and a first fixed reference device 16. It should be understood, however, that a similar technique would be used to determine the distances between either the first or second position sensors, 21 or 22, and the two fixed reference devices, 16 and 18. The exchange of signals in FIG. 6 is, therefore, exemplary for any of these determinations. With reference to FIGS. 4 and 6 and with specific reference to the determination of the length of line A, a first initiation signal 41 is transmitted by the first position sensor 21. The first initiation signal is of a known frequency that the first fixed reference device 16 is configured to recognize. That initiation signal 41 is transmitted at a time represented by dashed line 51. As represented by arrow 60, the first initiation signal 41 is received by the first fixed reference device 16 at a time which is a function of the distance A and the speed of a radio frequency signal. The received signal is identified by reference numeral 42 and is received at a time which is represented by dashed line 52. Between dashed lines 51 and 52 is the elapsed time for the initiation signal to travel from the first position sensor 21 on the marine vessel 10 to the shore based first fixed reference device 16. After receipt of the signal 42 by the first fixed reference device 16, a latency period occurs during which the signal 42 is recognized and the appropriate response is prepared. This latency period exists between dashed lines 52 and 53. A response signal 43 is then transmitted by the first fixed reference device 16. This signal is a radio frequency signal that travels at the speed of light and is received, at dashed line 54, by the first position sensor 21 mounted on the marine vessel 10. This received signal is identified by reference numeral 44. The graphical representation in FIG. 6 illustrates that the travel time of the initiation in response signals, identified by arrows 60 and 61, is represented by the time between dashed lines 51 and 52 added to the time between dashed lines 53 and 54. Since the speed of the signal is known, the distance A between the first position sensor 21 at point M and the first fixed reference device 16 at point F can be calculated.

Figure 7:
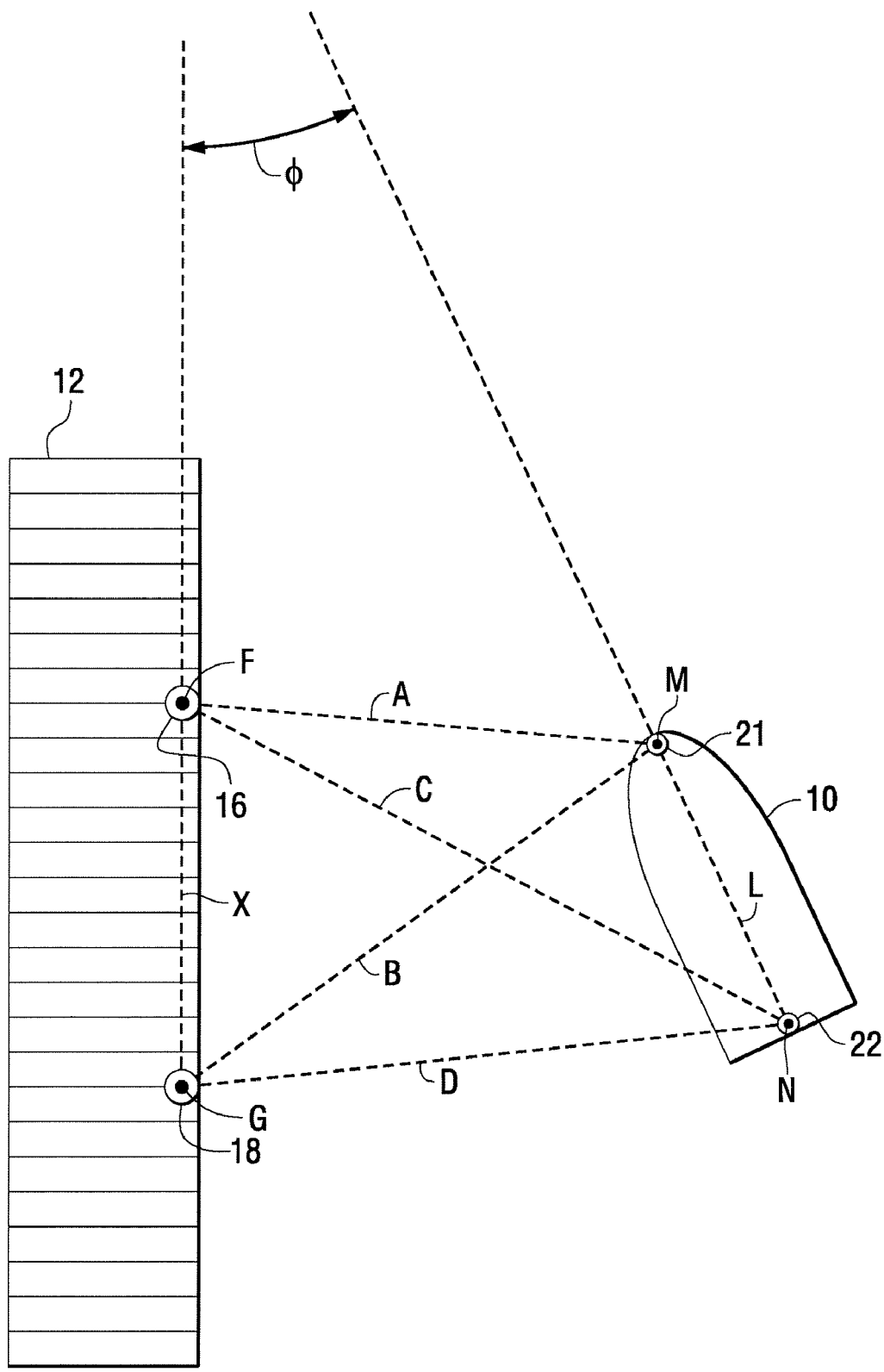
FIG. 7 shows numerous dimensional relationships that can be determined through the application of a preferred embodiment of the present invention.

FIG. 7 shows the marine vessel 10 at the position discussed above in conjunction with FIGS. 1, 2 and 4 along with numerous dimensional lines identifying the distances between various points. The length of lines X and L are easily determined because they represent the distances between devices that are either the fixed reference devices, 16 and 18, or the first and second position sensors, 21 and 22, which are attached to the marine vessel 10. The distances A, B, C and D can be determined in one of two ways, depending on the particular embodiment of the present invention which is used. If, for example, the first and second position sensors are radio frequency transceivers, the distances identified by reference letters A, B, C and D can be calculated according to the technique described above in conjunction with FIG. 6. If the length of the dashed lines shown in FIG. 7 are initially calculated in the manner described above in conjunction with FIG. 6, the various angles between dashed lines at points F, G, M and N can be determined by the law of cosines since the lengths of all of the sides of the relevant triangles are known. In an embodiment of the present invention which uses a Doppler direction finder to determine the angles between lines A and L, B and L, C and L, and D and L, the magnitudes of the dashed lines in FIG. 7 can be determined by the law of sines because lengths X and L are known in addition to the measured angles provided by the Doppler direction finder described above in conjunction with FIG. 5.

In FIG. 7, lines X and L are intentionally shown as being in non-parallel association with each other. To assist in maneuvering the marine vessel 10 in relation to the dock 12, it is important to know the angular relationship between lines X and L. As can be seen from FIG. 7 and the discussion regarding the known dimensions and angles, it can be seen that simple geometric calculations can determine all of the angles between line L and lines A and B. In addition, all of the angles between line X and lines A and C can be easily calculated. Since the length of line A is also known, the magnitude of angle Φ can be calculated. This allows the microprocessor 26, described above in conjunction with FIG. 3, to determine the degree of parallelism between lines X and L. If the goal is to maneuver the marine vessel toward a parallel relationship between lines X and L and move the marine vessel toward the dock 12, the magnitude of angle Φ can be very useful. Alternatively, the marine vessel 10 can be maneuvered until the dimensions of lines A and D are generally equal to each other prior to moving the marine vessel, in a sidle movement, toward the dock 12 as the magnitudes of lines A and D are decreased in a coordinated fashion. The specific maneuvering techniques used to perform this function can include the techniques described in U.S. patent application Ser. Nos. 11/248,482 and 11/248,483, which are described above. The primary purpose of the present invention is to determine the position of the marine vessel 10 and communicate this information, by the microprocessor 26, to software whose function is to cause movement of the marine vessel 10 in response to differences between an actual position and a desired position, as represented by the solid and dashed line versions of the marine vessel 10 in FIG. 1. The movement of the marine vessel 10 is represented generally by the two arrows in FIG. 1.

Figure 8:
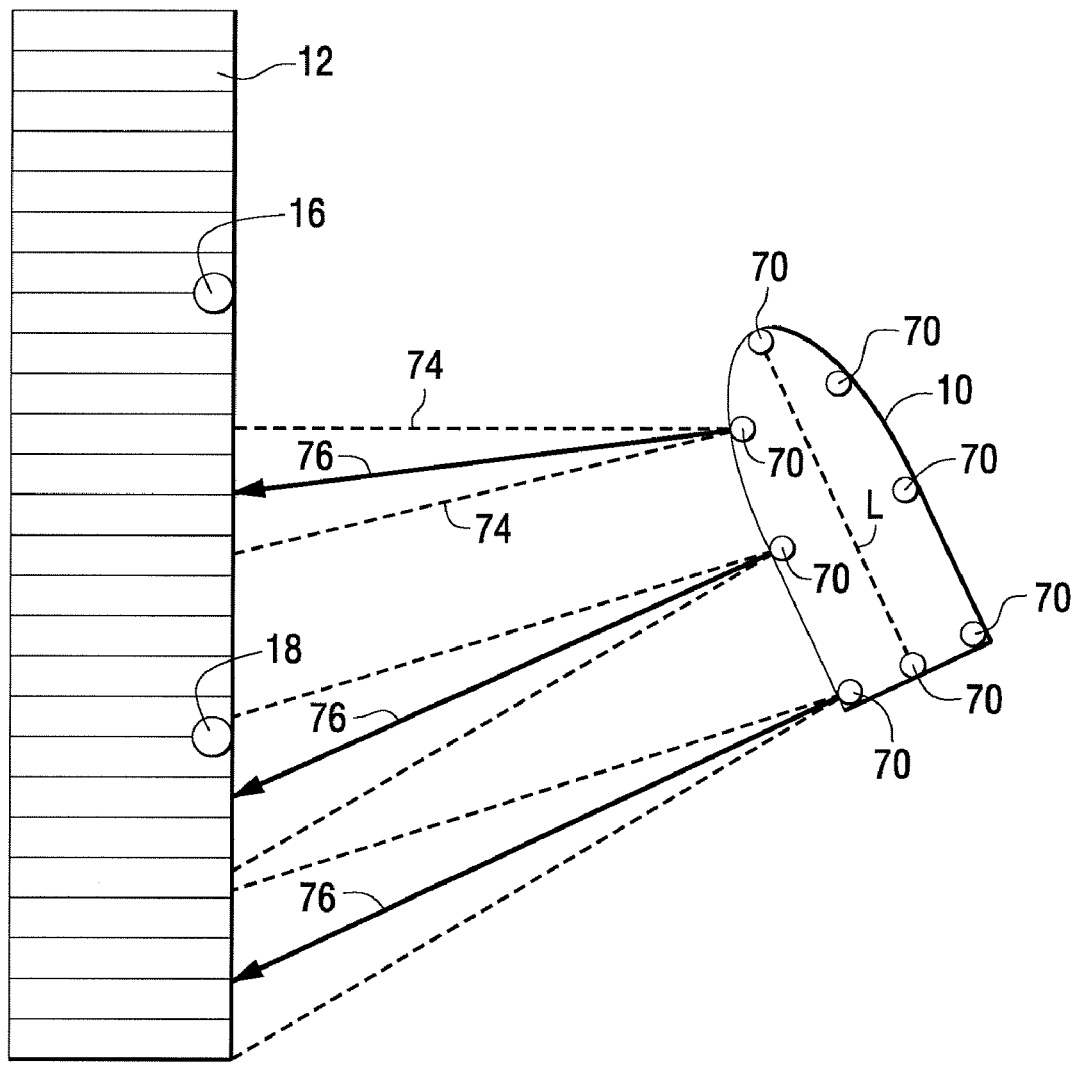
FIG. 8 shows an application of one alternative embodiment of the present invention in applications where a marine vessel has been maneuvered to a position of close proximity to a stationary object, such as a dock.

FIG. 8 illustrates an additional technique that can be used in conjunction with the method of the present invention. It employs a plurality of ultrasonic sensors, such as those described above in conjunction with the information relating to the Banner Corporation and its commercially available products. When the marine vessel 10 is maneuvered to a position within a certain preselected range of the dock 12, the ultrasonic sensors 70 can be activated to more accurately measure the precise distances between various locations of the marine vessel 70 and the dock 12. These sensors would transmit a generally conical ultrasonic signal, such as that represented by dashed lines 74, in a direction from the marine vessel 10 toward the dock 12. An echo signal would be received by the device and the distance 76 would be determined for each transmitting ultrasonic sensor that receives an echo signal. The ultrasonic sensors 70 could be connected in signal communication with the microprocessor 26 to determine the closest distance between a stationary object, such as the dock 12, and the marine vessel 10. It should be understood that the system described above in conjunction with FIG. 7 would be the primary position determination tool implemented under the scope of the present invention but, for purposes of accuracy, the ultrasonic sensors 70 could be used when the marine vessel 10 is in close proximity with the stationary object, such as the dock 12. This would be done because the ultrasonic sensors are capable of providing increased accuracy, in comparison to the radio frequency devices and Doppler direction finding devices described above, particularly when the marine vessel 10 is close to the dock 12.

With reference to FIGS. 1-8, the method for determining the position of a marine vessel 10 relative to a fixed structure, such as the dock 12, in a preferred embodiment of the present invention comprises the steps of providing a first position transceiver 21 and a second position transceiver 22 which are both attached to the marine vessel 10. It further comprises the steps of providing first and second fixed reference transponders, 16 and 18, which are attached to a stationary object such as the dock 12. The present invention further comprises the step of determining a first relative position between the first position transceiver 21 and the first and second fixed reference transponders, 16 and 18. It also comprises the step of determining a second relative position between the second position transceiver 22 and the first and second fixed reference transponders, 16 and 18. A preferred embodiment of the present invention further comprises the step of determining a position of the marine vessel 10 relative to the first and second fixed reference transponders, 16 and 18, as a function of the first and second relative positions. In a preferred embodiment of the present invention, the first and second relative positions include the magnitudes of lines A, B, C and D.

A preferred embodiment of the present invention can further comprise the steps of determining first and second angular relationships between lines A and B, which extend from the first position transceiver 21 to the first and second fixed reference transponders, 16 and 18. It also comprises the step of determining a second angular relationship between lines C and D which extend from the second position transceiver 22 to the first and second fixed reference transponders, 16 and 18. It can comprise the additional step of determining an angular relationship between a first line L which extends between the first and second position transceivers, 21 and 22, and a second line X which extends between the first and second fixed reference transponders, 16 and 18. This angular relationship is identified as angle Φ in FIG. 7.

The method of the present invention can further comprise the step of determining a first distance A between the first position transceiver 21 and the first fixed reference transponder 16 and the step of determining a second distance D between the second position transceiver 22 and the second fixed reference transponder 18.

The method of the present invention can further comprise the steps of transmitting an initiation signal 20 from the first position transceiver 21 to the first fixed reference transponder 16 and transmitting a response signal from the first fixed reference transponder 16 to the first position transceiver 21 in response to receiving the initiation signal. Furthermore, it can comprise the step of receiving the response signal by the first position transceiver 21 and computing a distance A between the first position transceiver 21 and the first fixed reference transponder 16 as a function of the elapsed time between the initiation transmitting step and the response signal receiving step. A preferred embodiment can further comprise the step of calculating an effective distance between the marine vessel 10 and a stationary point, such as a midpoint between the first and second fixed reference transponders, 16 and 18, as a function of the first and second distances. In a preferred embodiment of the present invention, it can further comprise the step of maneuvering the marine vessel 10 as a function of the position of the marine vessel relative to the first and second reference transponders, 16 and 18. This maneuvering can be accomplished by performing selective portions of the methods disclosed in U.S. patent application Ser. Nos. 11/248,482 and 11/248,483. These maneuvering steps can be accomplished according to the teachings of these two patent applications identified immediately above in situations where the marine vessel 10 is provided with two independently steerable marine propulsion devices.

Although the present invention has been described in considerable detail and illustrated to show a preferred embodiment, it should be understood that alternative embodiments are also within its scope.

We claim:

1. A method for determining the position of a marine vessel relative to a fixed structure, comprising the steps of:
providing a first position sensor attached to said marine vessel;
providing a second position sensor attached to said marine vessel;
providing a first fixed reference device which is stationary;
providing a second fixed reference device which is stationary;
determining a first relative position between said first position sensor and said first and second fixed reference devices;
determining a second relative position between said second position sensor and said first and second fixed reference devices;
determining a position of said marine vessel relative to said first and second fixed reference devices as a function of said first and second relative positions;
transmitting an initiation signal from said first position sensor to said first fixed reference device;
transmitting a response signal from said first fixed reference device to said first position sensor in response to receiving said initiation signal;
receiving said response signal by said first position sensor; and
computing a distance between said first position sensor and said first fixed reference device as a function of the elapsed time between said initiation transmitting step and said response signal receiving step.

2. The method of claim 1, wherein:
said first position sensor is a radio frequency transceiver; and
said second position sensor is a radio frequency transceiver.

3. The method of claim 1, wherein:
said step of computing a distance between said first position sensor and said first fixed reference device as a function of the elapsed time between said initiation transmitting step and said response signal receiving step is performed by a microprocessor disposed on said marine vessel and connected in signal communication with said first position sensor.

4. The method of claim 1, wherein:
said first position sensor is a Doppler direction finder; and
said second position sensor is a Doppler direction finder.

5. The method of claim 1, further comprising:
transmitting an initiation signal from said first position sensor to said first fixed reference device;
transmitting a direction signal from said first fixed reference device to said first position sensor in response to receiving said initiation signal;
receiving said direction signal by said first position sensor; and
computing an angle between said first position sensor and said first fixed reference device as a function of frequency differences of said direction signal at a plurality of reception positions created by said first position sensor.

6. The method of claim 5, wherein:
said step of computing an angle between said first position sensor and said first fixed reference device as a function of frequency differences of said direction signal at a plurality of reception positions created by said first position sensor is performed by a microprocessor disposed on said marine vessel and connected in signal communication with said first position sensor.

7. The method of claim 1, further comprising:
determining a first angular relationship between lines which extend from said first position sensor to said first and second fixed reference devices; and
determining a second angular relationship between lines which extend from said second position sensor to said first and second fixed reference devices.

8. The method of claim 1, wherein:
said first fixed reference device is a radio frequency transponder; and
said second fixed reference device is a radio frequency transponder.

9. The method of claim 1, further comprising:
determining an angular relationship between a first line which extends between said first and second position sensors and a second line which extends between said first and second fixed reference devices.

10. The method of claim 1, further comprising:
determining a first distance between said first position sensor and said first fixed reference device; and determining a second distance between said second position sensor and said second fixed reference device.

11. The method of claim 10, further comprising:
calculating an effective distance between said marine vessel and a stationary point as a function of said first and second distances.

12. The method of claim 1, wherein:
said first and second fixed reference devices are attached to a dock.

13. The method of claim 1, further comprising:
maneuvering said marine vessel as a function of said position of said marine vessel relative to said first and second fixed reference devices.

14. A method for determining the position of a marine vessel relative to a fixed structure, comprising the steps of:
providing a first position transceiver attached to said marine vessel;
providing a second position transceiver attached to said marine vessel;
providing a first fixed reference transponder which is stationary;
providing a second fixed reference transponder which is stationary;
determining a first relative position between said first position transceiver and said first and second fixed reference transponders;
determining a second relative position between said second position transceiver and said first and second fixed reference transponders;
determining a position of said marine vessel relative to said first and second fixed reference transponders as a function of said first and second relative positions;
transmitting an initiation signal from said first position transceiver to said first fixed reference transponder;
transmitting a response signal from said first fixed reference transponder to said first position transceiver in response to receiving said initiation signal;
receiving said response signal by said first position transceiver; and
computing a distance between said first position transceiver and said first fixed reference transponder as a function of the elapsed time between said initiation transmitting step and said response signal receiving step.

15. The method of claim 14, further comprising:
determining a first angular relationship between lines which extend from said first position transceiver to said first and second fixed reference transponders; and
determining a second angular relationship between lines which extend from said second position transceiver to said first and second fixed reference transponders.

16. The method of claim 14, further comprising:
determining an angular relationship between a first line which extends between said first and second position transceivers and a second line which extends between said first and second fixed reference transponders.

17. The method of claim 14, further comprising:
determining a first distance between said first position transceiver and said first fixed reference transponder; and
determining a second distance between said second position transceiver and said second fixed reference transponder.

18. The method of claim 17, further comprising:
calculating an effective distance between said marine vessel and a stationary point as a function of said first and second distances.

19. The method of claim 18, further comprising:
maneuvering said marine vessel as a function of said position of said marine vessel relative to said first and second fixed reference transponders.

20. A method for determining the position of a marine vessel relative to a fixed structure, comprising the steps of:
providing a first position sensor attached to said marine vessel;
providing a second position sensor attached to said marine vessel;
providing a first fixed reference device which is stationary;
providing a second fixed reference device which is stationary;
determining a first relative position between said first position sensor and said first and second fixed reference devices;
determining a second relative position between said second position sensor and said first and second fixed reference devices;
determining a position of said marine vessel relative to said first and second fixed reference devices as a function of said first and second relative positions;
determining a first angular relationship between lines which extend from said first position sensor to said first and second fixed reference devices;
determining a second angular relationship between lines which extend from said second position sensor to said first and second fixed reference devices;
determining an angular relationship between a first line which extends between said first and second position sensors and a second line which extends between said first and second fixed reference devices;
determining a first distance between said first position sensor and said first fixed reference device;
determining a second distance between said second position sensor and said second fixed reference device;
calculating an effective distance between said marine vessel and a stationary point as a function of said first and second distances; and
maneuvering said marine vessel as a function of said position of said marine vessel relative to said first and second fixed reference devices.

21. The method of claim 20, wherein:
said first position sensor is a radio frequency transceiver; and
said second position sensor is a radio frequency transceiver.

22. The method of claim 21, wherein:
said first fixed reference device is a radio frequency transponder; and
said second fixed reference device is a radio frequency transponder.

23. The method of claim 22, wherein:
said first position sensor is a Doppler direction finder; and
said second position sensor is a Doppler direction finder.

* * * * *